US00RE42306E

(19) United States
(12) Reissued Patent
Webb et al.

(10) Patent Number: US RE42,306 E
(45) Date of Reissued Patent: Apr. 26, 2011

(54) APPARATUS AND SYSTEM FOR CHARGING A PORTABLE ELECTRONIC DEVICE

(75) Inventors: William D. Webb, San Francisco, CA (US); Huy Nguyen, Round Rock, CA (US)

(73) Assignee: Palm, Inc., Sunnyvale, CA (US)

(21) Appl. No.: 11/283,476

(22) Filed: Nov. 18, 2005

Related U.S. Patent Documents

Reissue of:
(64) Patent No.: 6,650,088
Issued: Nov. 18, 2003
Appl. No.: 10/131,648
Filed: Apr. 23, 2002

(51) Int. Cl.
*H01M 10/46* (2006.01)

(52) U.S. Cl. ..... 320/115
(58) Field of Classification Search ..... 320/107, 320/112, 113, 114, 115; 429/96, 97, 98, 99, 429/100; 307/150; D13/103, 107
See application file for complete search history.

(56) References Cited

U.S. PATENT DOCUMENTS

| | | | | |
|---|---|---|---|---|
| 3,659,180 | A | * | 4/1972 | Urbush |
| 4,419,616 | A | * | 12/1983 | Baskins et al. |
| 5,229,701 | A | * | 7/1993 | Leman et al. |
| 5,293,644 | A | | 3/1994 | Barry et al. |
| 5,340,662 | A | * | 8/1994 | McCarter ..... 429/9 |
| 5,375,226 | A | | 12/1994 | Sano et al. |
| 5,448,764 | A | | 9/1995 | Sondermann et al. |
| 5,455,466 | A | | 10/1995 | Parks et al. |
| 5,555,426 | A | | 9/1996 | Johnson et al. |
| 5,598,536 | A | | 1/1997 | Slaughter, III et al. |
| 5,668,952 | A | | 9/1997 | Slane |
| 5,835,720 | A | | 11/1998 | Nelson et al. |
| 5,854,901 | A | | 12/1998 | Cole et al. |
| 5,898,690 | A | | 4/1999 | Masashi |
| 6,006,274 | A | | 12/1999 | Hawkins et al. |
| 6,026,445 | A | | 2/2000 | Kephart et al. |
| 6,138,245 | A | | 10/2000 | Son et al. |
| 6,249,814 | B1 | | 6/2001 | Shaffer et al. |
| 6,266,539 | B1 | | 7/2001 | Pardo |
| 6,389,426 | B1 | | 5/2002 | Turnbull et al. |
| 6,392,383 | B1 | * | 5/2002 | Takimoto et al. |
| 6,405,049 | B2 | | 6/2002 | Herrod et al. |
| 6,442,144 | B1 | | 8/2002 | Hansen et al. |
| 6,445,936 | B1 | | 9/2002 | Cannon et al. |
| 6,522,100 | B2 | * | 2/2003 | Hansford ..... 320/106 |
| 6,664,760 | B2 | * | 12/2003 | Kobayashi ..... 320/115 |
| 6,913,477 | B2 | | 7/2005 | Dayan et al. |

FOREIGN PATENT DOCUMENTS

| | | |
|---|---|---|
| EP | 0395469 | 10/1990 |
| FR | 2601161 | 1/1988 |

OTHER PUBLICATIONS

Mel B. W. et al., "Tablet Personal Computer In The Year 2000" Communications of the Association for Computing Machinery, New York, NY vol. 31, No. 6 Jun. 1, 1998 pp. 639–646 XP0000476333ISSN:0001–0782.

Opticon Sensors Europe B.V.; User's Manual; Wand Terminal DWT 7133 Cradle DCW 9931; version 1–98, printed 11/00; Copyright 2000.

* cited by examiner

*Primary Examiner*—Edward Tso

(57) ABSTRACT

A charging apparatus for a portable rechargeable electronic device is described. The charging apparatus contains a substantially flat conductive surface for receiving the electronic device placed thereon. Small conducting nodules of the device mate with the conductive surface to charge a rechargeable battery of the device. Charging may commence upon placement of the device. The surface may contain a positive and a negative electrode. The surface may have lips placed around the perimeter to form a tray like structure. Synchronization with a host system and the device may occur wirelessly.

34 Claims, 18 Drawing Sheets

APPARATUS AND SYSTEM FOR CHARGING A PORTABLE ELECTRONIC DEVICE

Matter enclosed in heavy brackets [ ] appears in the original patent but forms no part of this reissue specification; matter printed in italics indicates the additions made by reissue.

FIELD OF THE INVENTION

The present invention relates to the charging of rechargeable portable electronic devices, such as a handheld computer system. More particularly, embodiments of the present invention provide a novel apparatus and system for charging a portable computer device.

BACKGROUND OF THE INVENTION

Continuing advances in technology have enabled miniaturization of the components required to build computer systems. New categories of computer systems have been created. One category of computer systems developed has been the portable or hand held computer system, referred to as a personal digital assistant or PDA. Other examples of handheld computer systems include electronic address books, electronic day planners, electronic schedulers, cellular phones, pages, and the like.

A handheld computer system is a computer that is small enough to be held in the user's hand and as such is "handholdable." As a result, a handheld computer system is readily carried about in a user's briefcase, purse, and in some instances, in a user's pocket. By virtue of its size, the handheld computer, being inherently lightweight, is therefore exceptionally portable and convenient. Various hand-held computers provide a multitude of functions in a nearly endless variety of shapes, sizes, and configurations. One common link between the products is that each of the handheld computer systems typically needs an internal power supply. Numerous versions of handhelds are powered by user replaceable batteries.

Many other handhelds are configured with rechargeable power supplies. In handhelds configured with rechargeable batteries, nearly all handhelds are accompanied by some sort of charging cradle or cable. Because it is quite common for each handheld type or models thereof to have a particular form factor and cradle connection, it is also quite common for each charging cradle to be custom designed for a specific handheld type or model.

Conventionally, charging of a handheld required a user to specifically insert the handheld in a cradle in a correct alignment position to electrically couple the handheld to the charging cradle, ensuring proper charging of the handheld. In FIG. 1, an illustrated rear view of an exemplary handheld computer system 1a is shown. Toward the bottom of handheld 1a, is an electrical connector 3a. Electrical connector 3a is adapted to contact a reciprocating electrical connector disposed within a cradle, e.g., electrical connector 3b of FIG. 2.

FIG. 2 is an illustrated front view of an exemplary cradle 2. Cradle 2 includes an electrical connector 3b, and a back mechanical support portion 4, for supporting a handheld, as indicated by dotted line 1a, when inserted. Cradle 2 is also shown to have a synchronizing button 5 which, when pressed, initiates a data/program synchronization of the handheld with a host or base computer. It is common for cradle 2 to be communicatively coupled a host or base computer via hard-wired connection, e.g., serial cable 6. Furthermore, because the length of serial cable 6 is somewhat limited, cradle 2 must be disposed within close proximity to the host computer.

Thus, when a user wants to recharge or synchronize their handheld, they must go to the area where a host computer and cradle, coupled thereto, are located. While this is acceptable for some, it is inconvenient for other users. Further, there are many users who have more than one handheld computer system. For those users, trying to determine which handheld is associated with which cradle can be aggravating and lime consuming.

Additionally, many of the mechanical slots are adapted to receive the connector of the handheld at only tight alignments. This means the user must slowly, gently, and with considerable skill drop the handheld into the recharging cradle. Considering that this event may take place each day, such alignment becomes a tedious process.

SUMMARY OF THE INVENTION

Thus exists a need for an apparatus that provides charging of a handheld computer system. An additional need exists for an apparatus that provides the above, and which provides a convenient and simple mating mechanism between the handheld computer and the charging cradle. A further need exists for an apparatus that meets the above and which also complies with the many form factors of the various types and models of handheld computers. Another need exists for an apparatus that enables synchronization without requiring hard wiring of the cradle to the host computer.

Embodiments of the present invention provide an apparatus and system that allows charging of a portable electronic device, such as a handheld computer system. Embodiments of the present invention further provide an apparatus that achieves the above, and which provides a convenient and simple mating mechanism between the handheld computer and the charging cradle. Embodiments of the present invention also comply with the many form factors of the various types and models of handheld computers. Additionally, embodiments of the present invention provide for synchronization of data and programs without requiring hard wiring of the cradle to the host computer.

In one embodiment, the present invention is comprised of a conductive region that is coupled to a charging apparatus. The conductive region comprises a contactable exposed surface. A charge controller is electronically coupled to the conductive portion. The charge controller is for polarity sensing and controlling the charging of a portable electronic device. The portable electronic device is configured to be charged by said charging apparatus. The charging apparatus is adapted to have the portable electronic device placed upon the contactable exposed surface of the charging apparatus, and when the portable electronic device is so placed, the charging thereof is enabled.

In one implementation, the present invention includes a cradle having a relatively large surface area and flat electrodes, e.g., the charging surface. The flat electrodes may resemble a base or tray for receiving a portable device. The device may contain pads or feet which are designed to rest on the flat surfaces of the electrodes when the device is placed into the tray. Advantageously, communication with a host computer may take place using a wireless technique between the device and the host system. Advantageously, the device may be leisurely placed into the tray at a number of various alignments while still being properly aligned for adequate recharging.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus and system for charging a portable electronic device is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a charging apparatus and system for a portable electronic device, such as a handheld computer system or personal digital assistant. However, it is noted that the present invention can be used with nearly any other type of portable electronic device, e.g., an electronic address book, an electronic scheduler, a cellular phone, a pager, etc., that is rechargeable and which has the capability to access some type of central device or central site, including but not limited to handheld computer systems.

Figure 1:
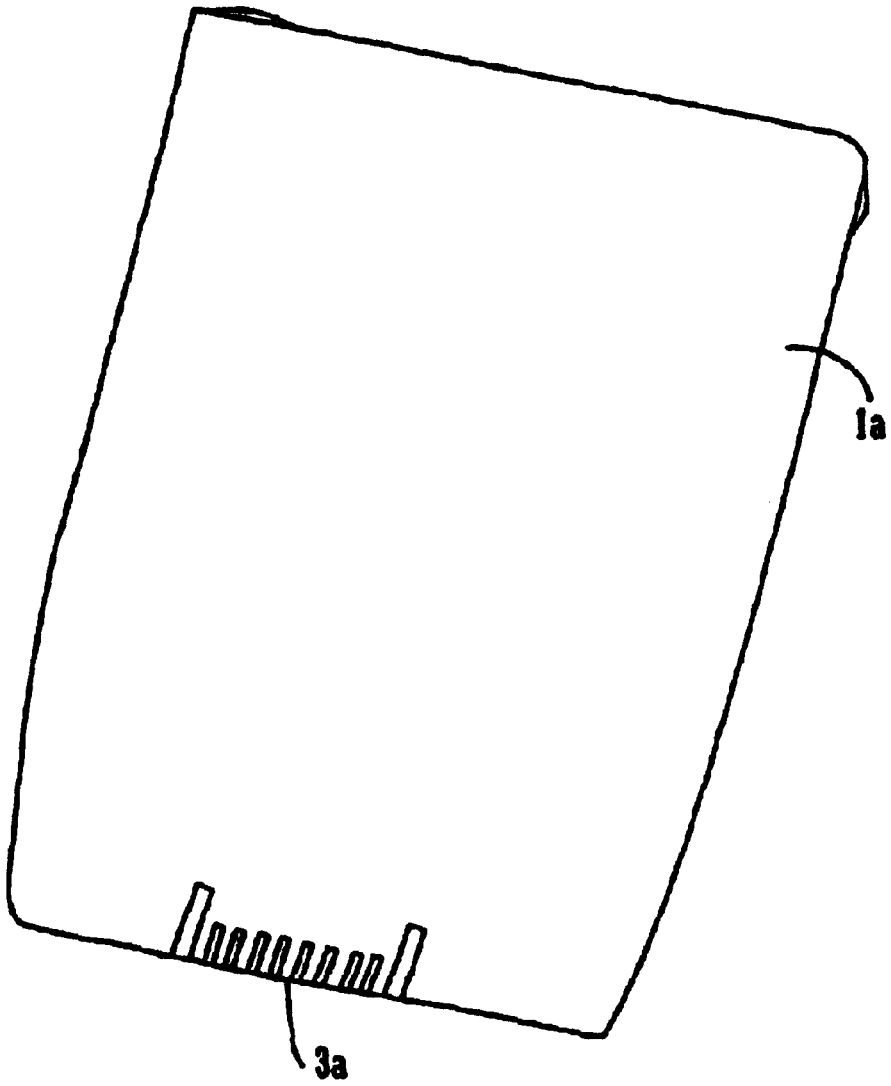
FIGURE 1 (Prior Art)
FIG. 1 is an illustrated rear-view of an exemplary handheld computer system, in accordance with one embodiment of the present invention.
Figure 2:
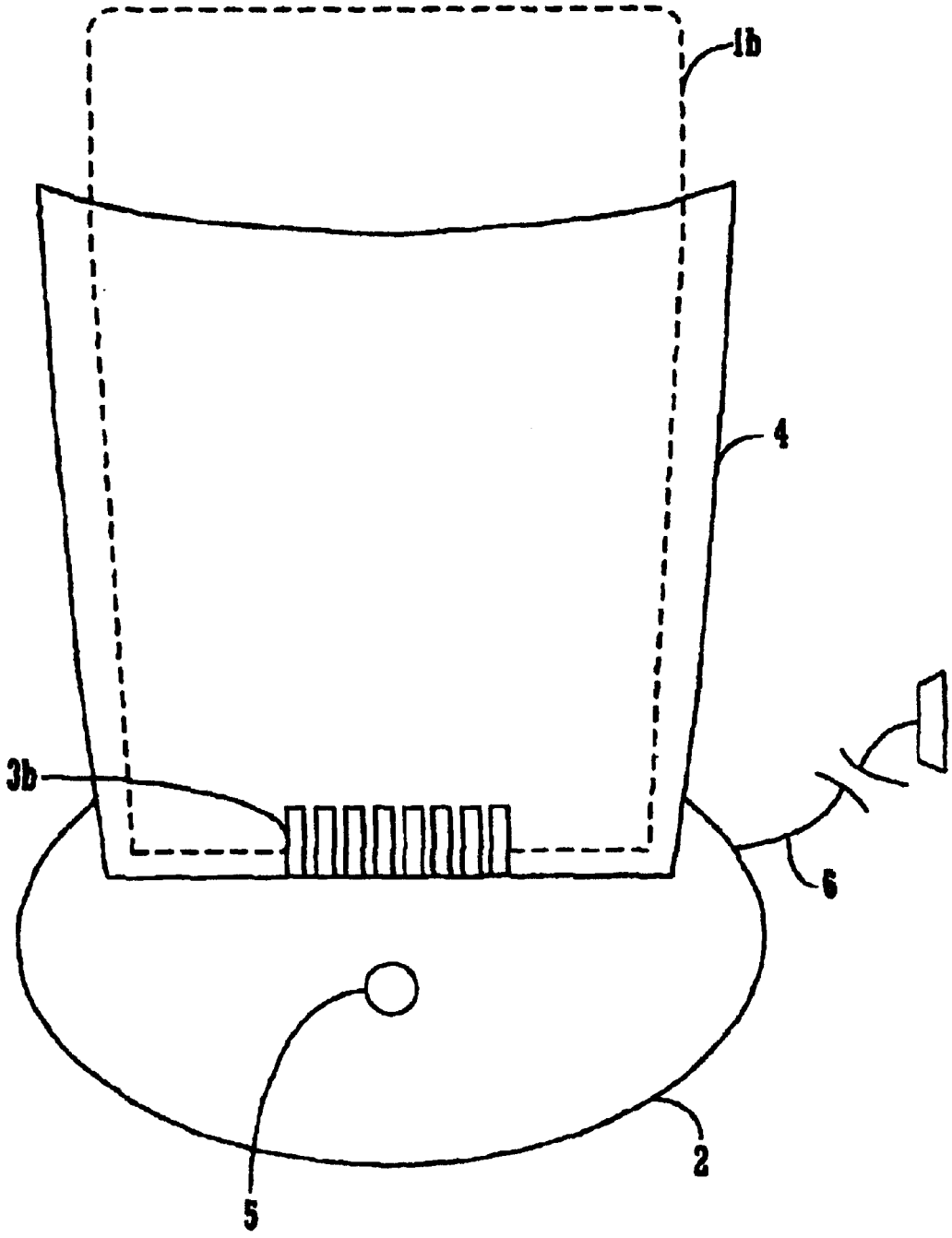
FIGURE 2 (Prior Art)
FIG. 2 is an illustrated front-facing view of an exemplary charging cradle, in accordance with one embodiment of the present invention.
Figure 3:
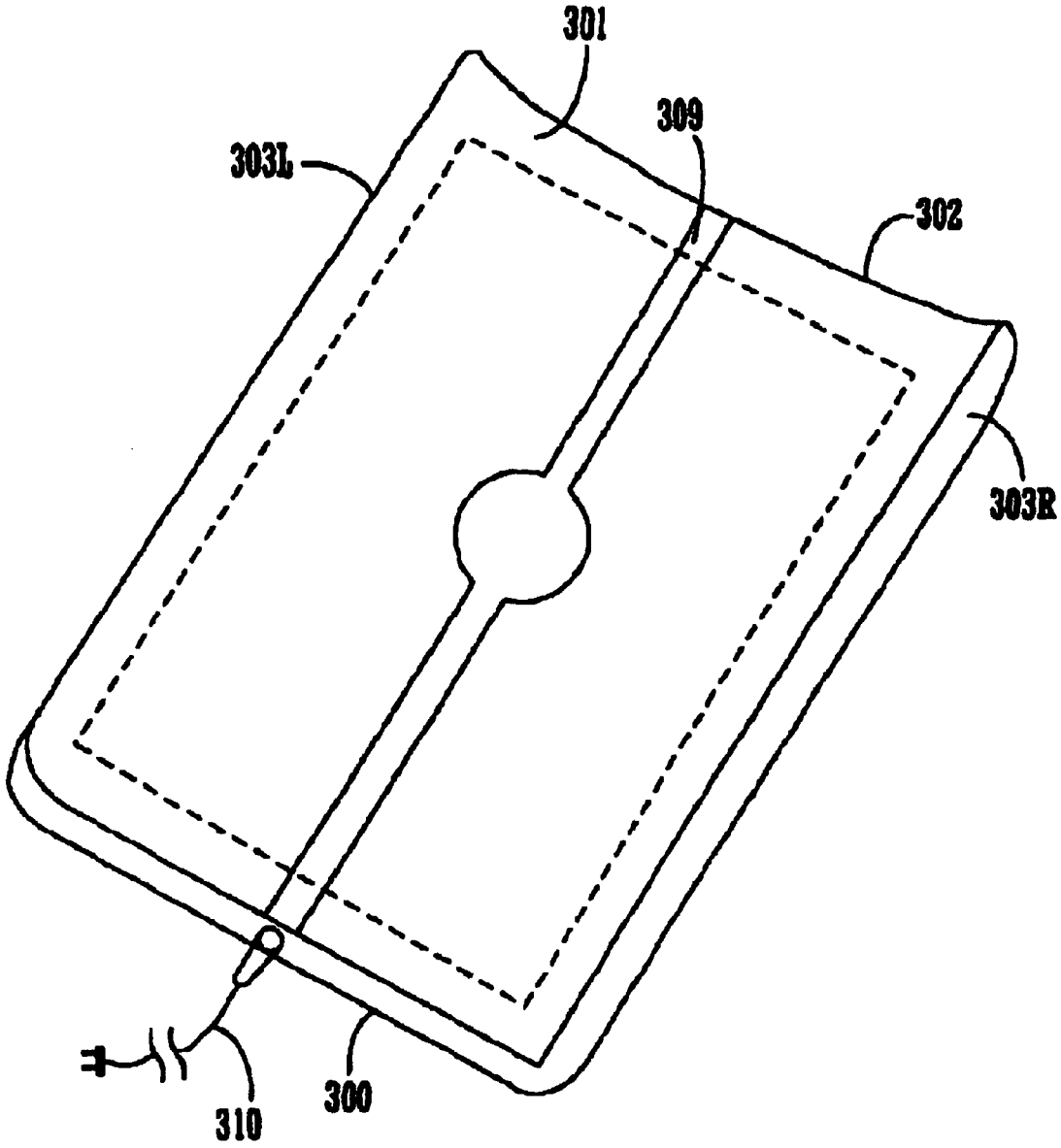
FIG. 3 is an illustrated front-facing view of a charging apparatus, in accordance with one embodiment of the present invention.
Figure 6A:
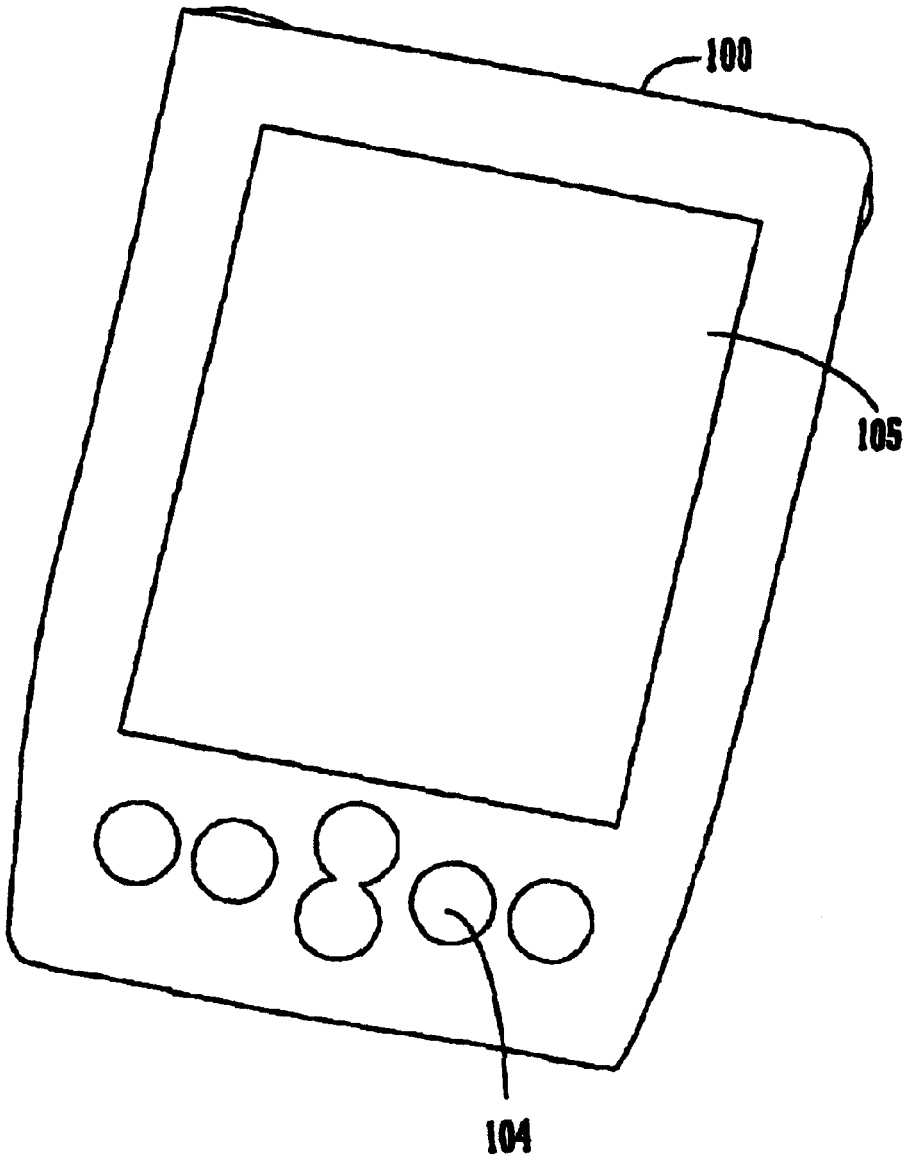
FIG. 6A is an illustrated front-facing view of a handheld computer, in accordance with one embodiment of the present invention.

FIG. 3 is an illustrated rear-view of a charging apparatus 300 for charging a portable electronic device, e.g., handheld computer system 100 of FIG. 6A, in one embodiment of the present invention. FIG. 3 shows charging apparatus 300, in one embodiment, comprising a conductive contact region 301 "electrode" and a conductive contact region 302 "electrode." Conductive contact regions 301 and 302 can be manufactured using nearly any conductive material, e.g., aluminum, copper, gold, etc., or an alloy of conductive materials. Conductive contact regions 301 and 302 have, in one embodiment, their exposed contact regions isolated from one another, via isolator strip 309, so as to prevent shorting. Lipped side edges 303l and 303r (left side and right side, respectively) which curve upward from the side edges of charging apparatus 300 are also shown in FIG. 3. Lipped side edges 303l and 303r form a tray with the electrode surfaces and thereby provide for an easy, simple and correct insertion of a portable electronic device, e.g., portable electronic device 100 of FIGS. 6A and 6B, to have the proper alignment with the electrodes when disposed upon charging apparatus 300. Electrical outlet plug 310, electrically coupled with charging apparatus 300, is for connecting to a current source, such as current provided from a common wall outlet. Although FIG. 3 depicts electrical outlet plug 310 as disposed along an end edge of charging apparatus 300, it is noted that electrical outlet plug 310 can be disposed in nearly any other location upon charging apparatus 300, in another embodiment of the present invention. In one embodiment, charging apparatus 300 has the ability to transmit and receive data and information over a wireless communication interface, e.g., Bluetooth wireless interface (Bluetooth transceiver (interface) 308 of FIG. 10), and a Bluetooth environment as described in FIGS. 12 and 13. In one embodiment, charging apparatus 300 is configured with a Bluetooth interface and implemented in Bluetooth environment such as the Bluetooth interface and environment as described in currently pending U.S. patent application Ser. No. 09,676,270, filed Sep. 28, 2000 and entitled "Efficient Discovery of Device in Bluetooth Environment," by Kammer, D, et al., which is hereby incorporated herein by reference.

Figure 6B:
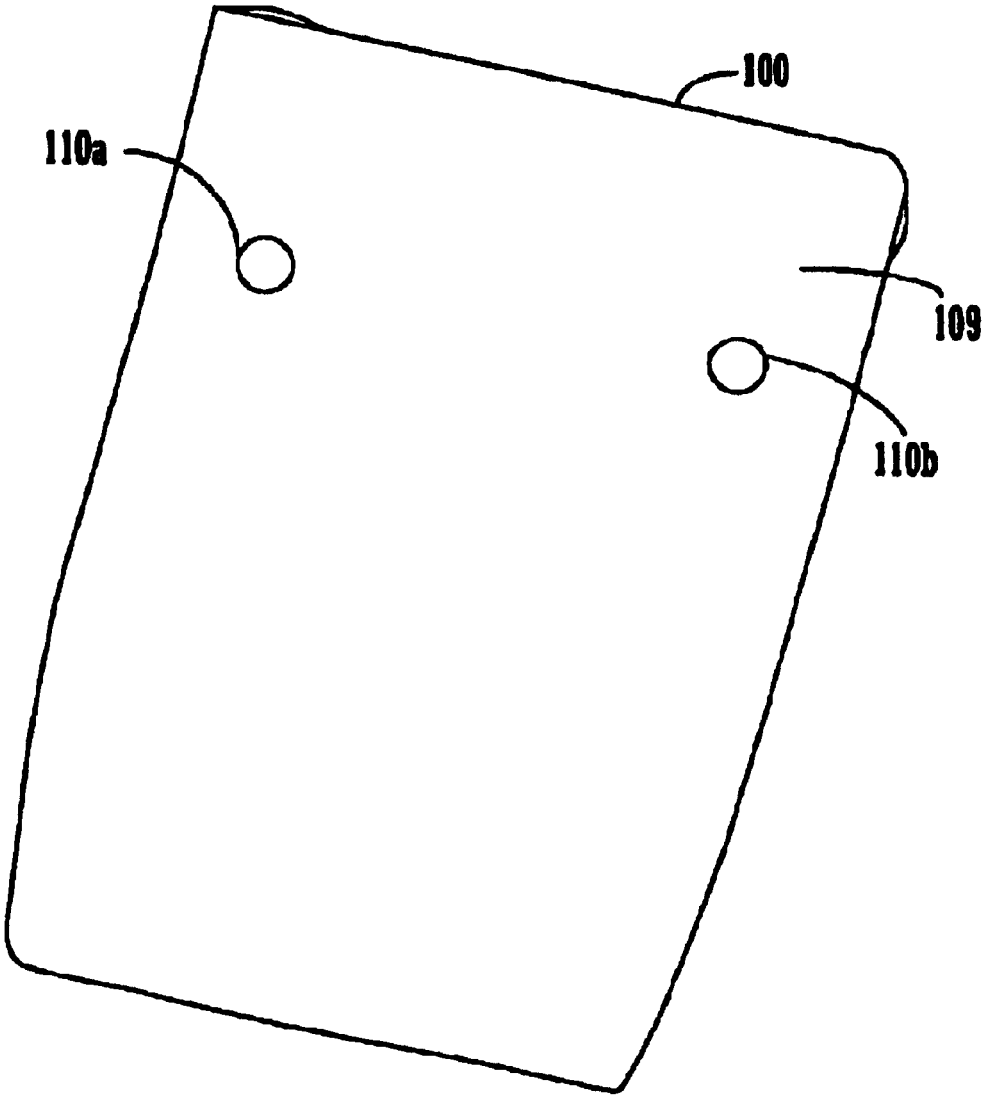
FIG. 6B is an illustrated rear-facing view of a handheld computer, in accordance with one embodiment of the present invention.
Figure 7A:
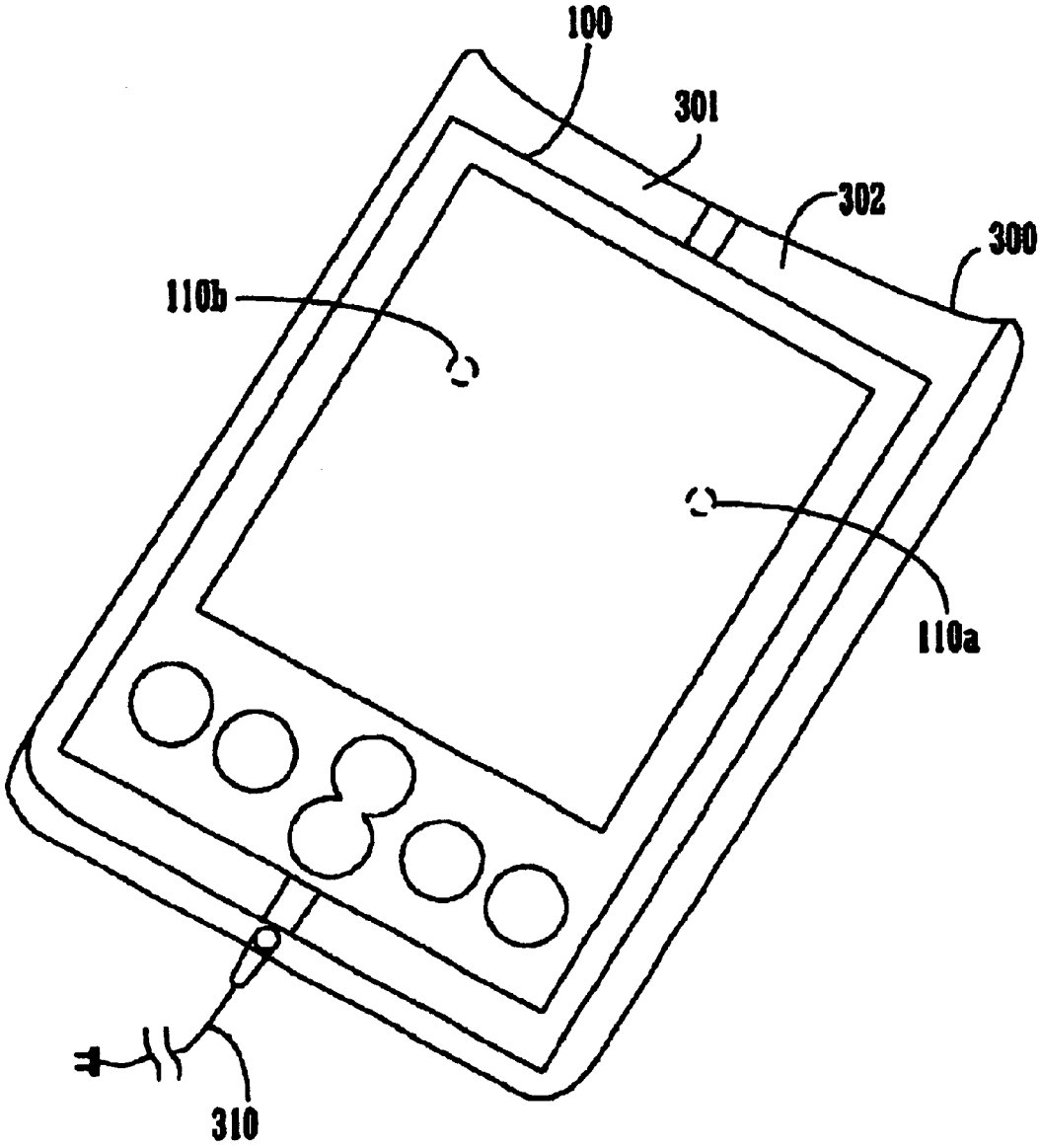
FIG. 7A is an illustrated view of a portable electronic device placed in a charging apparatus in a first alignment, in accordance with one embodiment of the present invention.
Figure 7B:
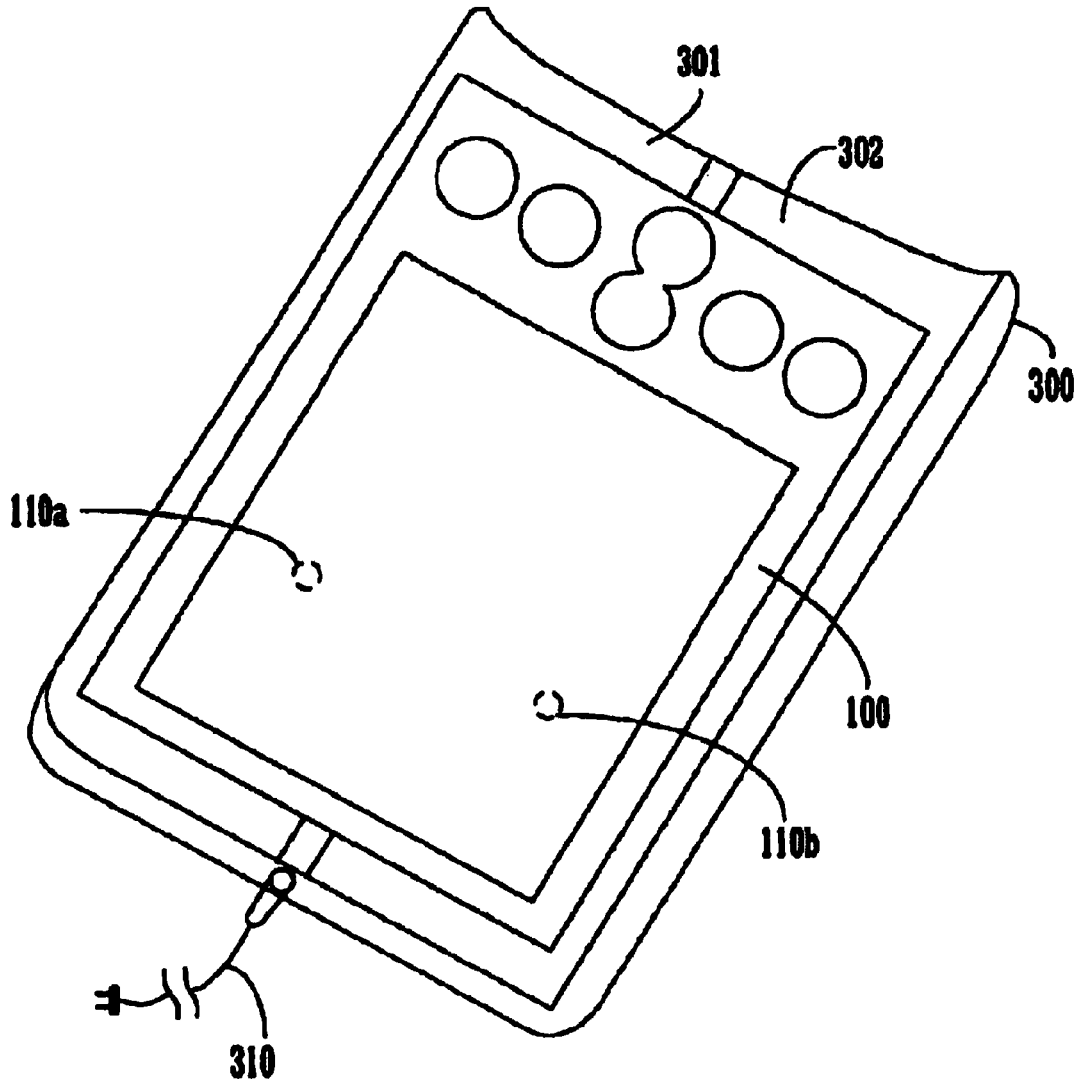
FIG. 7B is an illustrated view of a portable electronic device placed in a charging apparatus in a second alignment, in accordance with one embodiment of the present invention.

Still referring to FIG. 3, conductive contact regions 301 and 302 are adapted to enable charging a portable electronic device, e.g., portable electronic device 100 of FIG. 6A and FIG. 6B, when portable electronic device 100 is placed in charging apparatus 300, as shown in FIGS. 7A and 7B. By virtue of lipped side edges 303l and 303r preventing misalignment, conductive contact nodules 110a and 110b of portable electronic device 100 (FIG. 6B) are in contact with conductive contact regions 301 and 302 of charging apparatus 300, in one embodiment of the present invention. Accordingly, current obtained through a plugged in electrical outlet plug 310 can flow through charging apparatus 300 and provide the necessary power to recharge placed portable electronic device 100.

Figure 10:
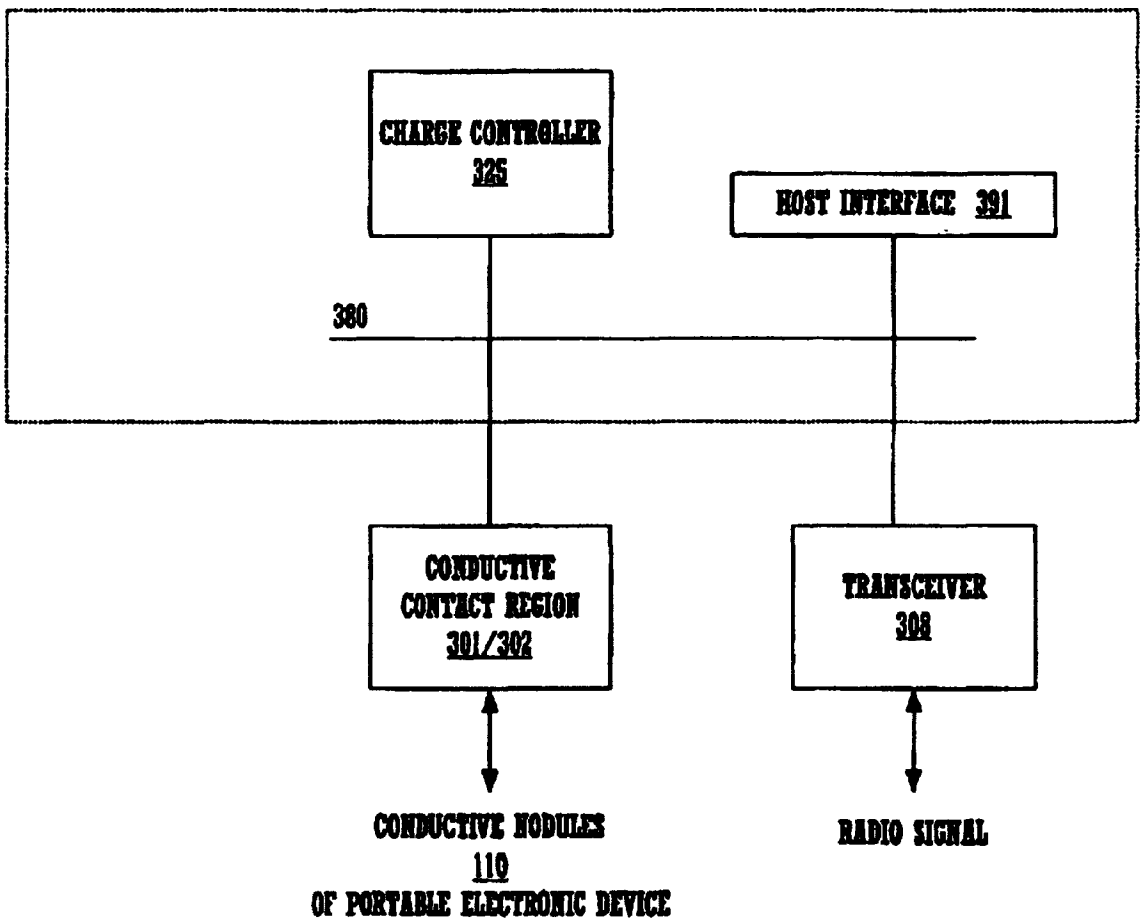
FIG. 10 is a block diagram of electronic circuitry and components integrated within a portable electronic device charging apparatus, in accordance with one embodiment of the present invention.

Still with reference to FIG. 3, in one embodiment of the present invention, charging apparatus 300 has a charging controller 325 integrated therein, as shown in FIG. 10, to prevent and guard against electrical shorts. Because of charging controller 325, it is irrelevant as to whether portable electronic device 100 is placed on charging apparatus 300 with the display screen oriented right side up or upside down, as shown in FIGS. 7A and 7B. Regardless of the orientation, when conductive nodules 110a and 110b are in contact with conductive contact regions 301 and 302, respectively, or when conductive nodules 110a and 110b are in contact with conductive contact regions 301 and 301, respectively, charging of a placed portable electronic device is enabled.

Figure 4:
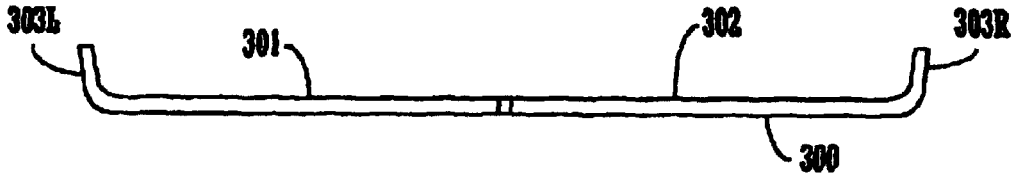
FIG. 4 is an illustrated profile view of a charging apparatus, in accordance with one embodiment of the present invention.

FIG. 4 is a profile view of charging apparatus 300, in one embodiment of the present invention. Lipped edge sides 303l and 303r are shown and, as described above, provide an easy, simple, and proper orientation of portable electronic device 100 (FIGS. 6A and 6B) when placed thereon. By virtue of lipped edge sides 303l and 303r, when portable electronic device 100 is placed thereon, conductive nodules 110a and 110b (FIG. 6B) inherently are in contact with conductive contact regions 301 and 302, respectively (as shown in FIG. 7A), or nodules 110a and 110b are inherently in contact with regions 302 and 301, respectively, when portable electronic device 100 is placed in charging apparatus 300 upside down (as shown in FIG. 7B), completing the charging circuit, thus enabling charging of the placed computer system.

Figure 5A:
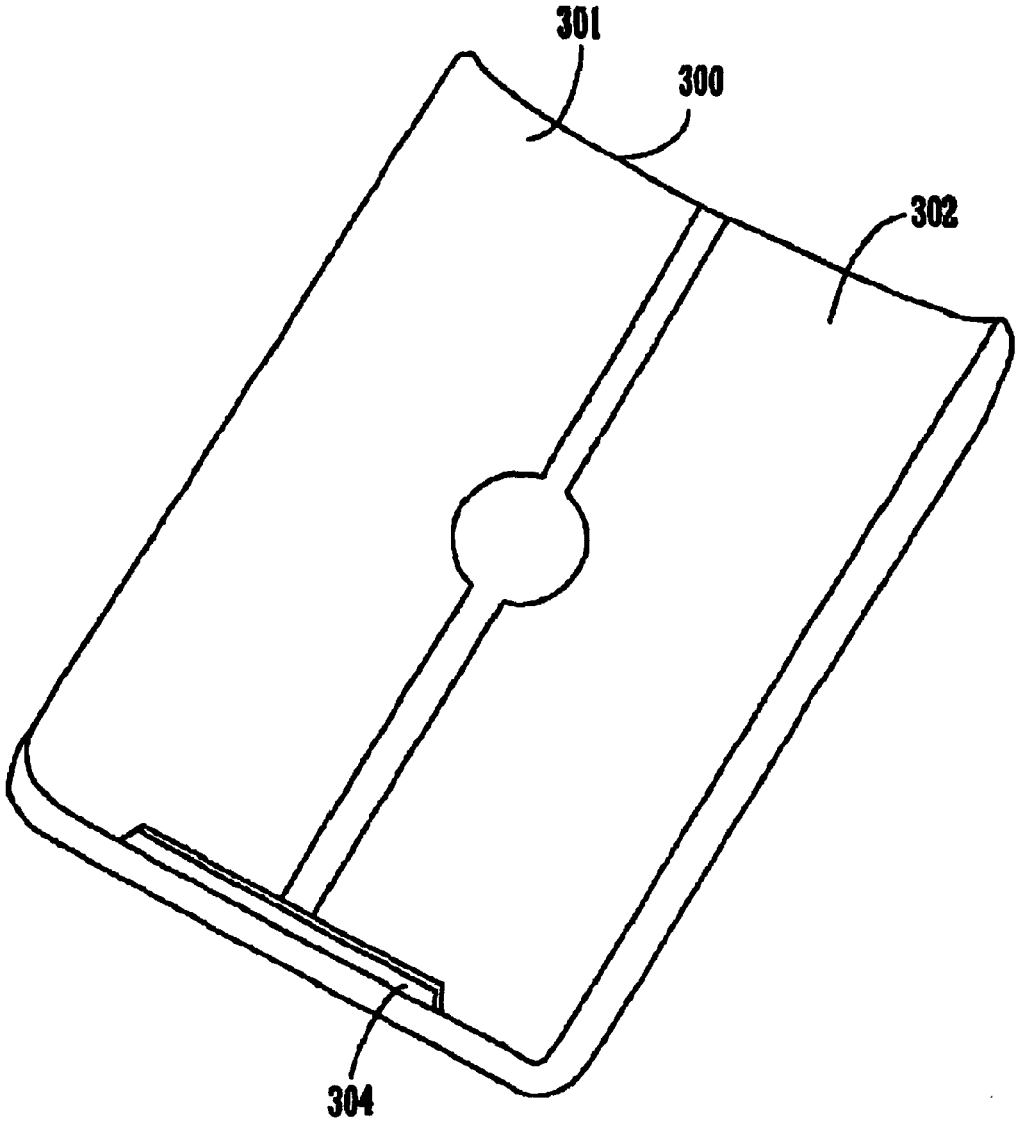
FIG. 5A is an illustrated front-facing view of a charging apparatus, in accordance with one embodiment of the present invention.

FIG. 5A is a front facing illustration of a charging apparatus 300, in one embodiment of the present invention. Charging apparatus 300 of FIG. 5 is analogous to charging apparatus 300 of FIGS. 3 and 4, with one addition. A lipped edge end 304, similar to either lipped edge side 303l or 303r is disposed at one end of charging apparatus 300, in one embodiment of the present invention. Lipped edge end 304 is for preventing slide through of a portable electronic device 100 that is placed on charging apparatus 300. An electrical outlet plug 310 is also present, although nut shown in FIG. 5A, as shown in FIG. 3. In another embodiment, there can be a lipped edge end 304 at both ends of charging apparatus 300.

Figure 5B:
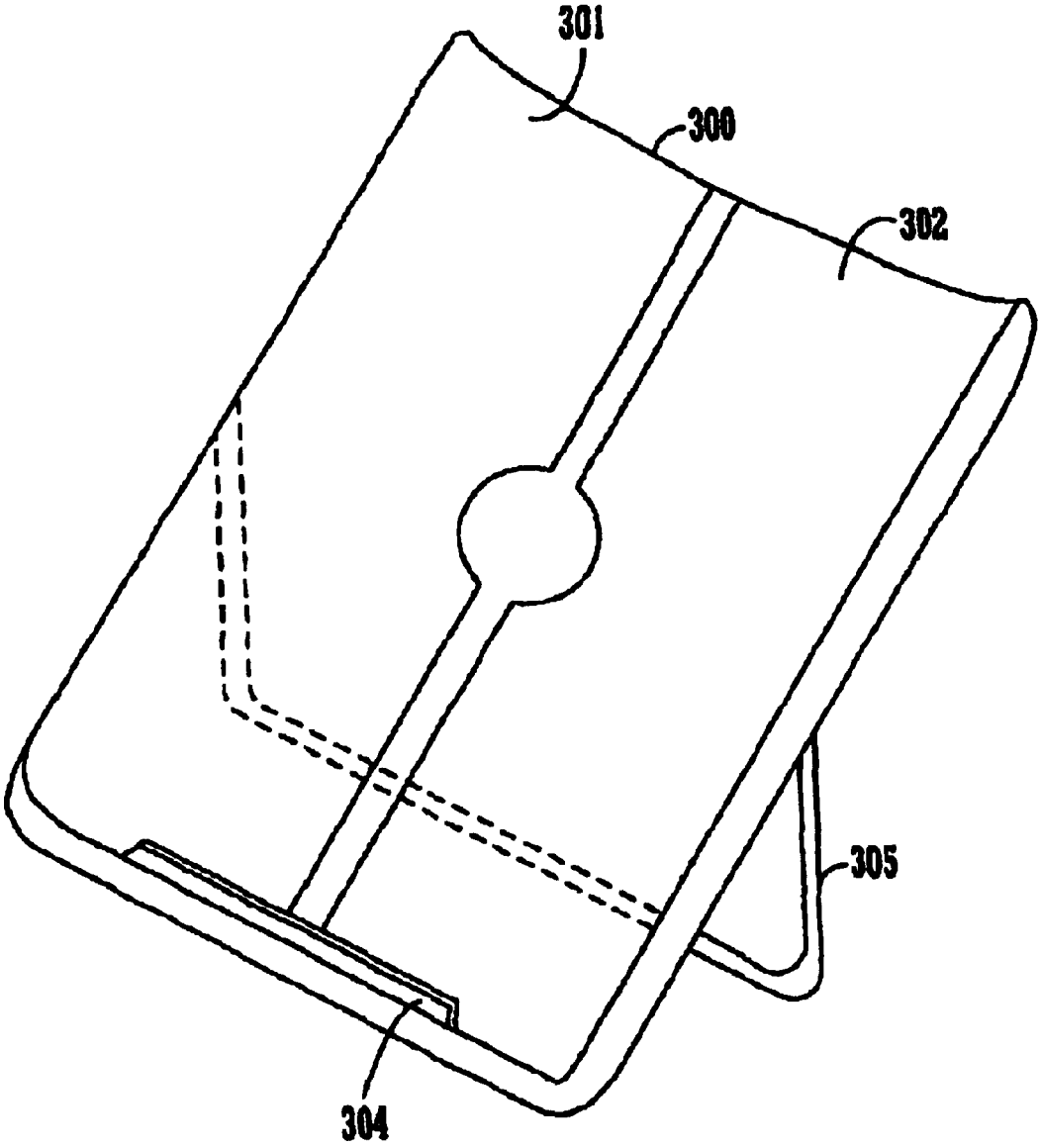
FIG. 5B is an illustrated front-facing view of a charging apparatus, in accordance with one embodiment of the present invention.

FIG. 5B is a front facing illustration of a charging apparatus 300, in one embodiment of the present invention. Charging apparatus 300 of FIG. 5B is analogous to charging apparatus 300 of FIGS. 3, 4, and 5A, with one addition. A flip down stand 305 is coupled to the underside of charging apparatus 300 and is adapted to support charging apparatus 300 in a more vertical position when compared to charging apparatus 300 of FIGS. 3, 4, and 5A. Flip down stand 305 utilizes lipped edge end 304 to stop a portable electronic device from sliding off of charging apparatus 300, when flip down stand 305 is in the open position, as shown in FIG. 5B.

FIG. 6A is an illustrated front-facing view of a portable electronic device 100, in one embodiment of the present invention. In one embodiment, portable electronic device 100 has the ability to transmit and receive data and information over a wireless communication interface, e.g., a Bluetooth wireless interface, such as Bluetooth communication transceiver 1108 of FIG. 11, and as described in FIGS. 12 and 13. In one embodiment, portable electronic device 100 is configured with a Bluetooth interface and implemented in Bluetooth environment such as the Bluetooth interface and environment as described in currently pending U.S. patent application Ser. No. 09/676,270, filed Sep. 28, 2000 and entitled "Efficient Discovery of Device in Bluetooth Environment," by Kammer, D, et al., which is hereby incorporated herein by reference.

A display area 105 and programmable/dedicated buttons 104 are shown. Integrated within portable electronic device is a renewable energy source (e.g., renewable energy source 1111 of FIG. 11)

FIG. 6B is an illustrated rear-facing view of a portable electronic device 100, in accordance with one embodiment of the present invention. In one embodiment, conductive nodules 110a and 110b are shown as disposed within rear surface area 109. Conductive nodules 110a and 110b, in one embodiment, are adapted to be in contact with a conductive contact region, e.g., conductive contact region 301 and 302 of charging apparatus 300 of FIGS. 3, 4, 5A, 5B, and as shown in FIGS. 7A and 7B. Although conductive nodules 110a and 110b are shown as having a circular shape, other shapes, e.g., rectangular, ovoid, triangular, and the like, are equally well suited to be implemented as conductive nodules. Additionally, while one embodiment describes conductive nodules 110a and 110b as disposed toward the top of rear surface area 109 of portable electronic device 100, in other embodiments, conductive nodules 110a and 110b can be disposed in nearly any location on rear surface area 109, provided that each conductive nodule can contact a conductive contact region of a charging apparatus 300.

Figure 6C:
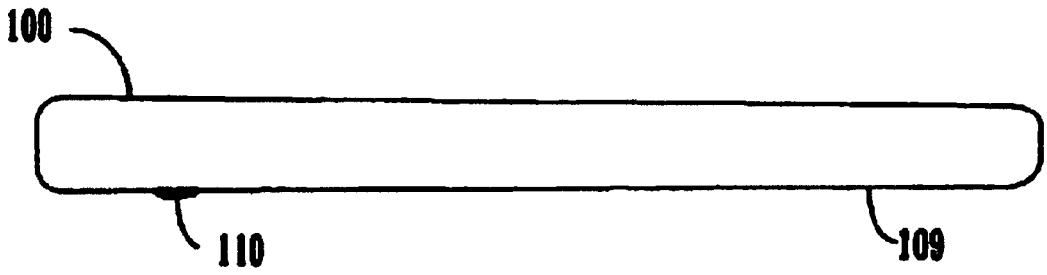
FIG. 6C is an illustrated side/profile view of a handheld computer system, in accordance with one embodiment of the present invention.

FIG. 6C is an illustrated side-view of a portable electronic device 100, in accordance with one embodiment of the present invention. Conductive nodules 110 (a and b) are shown protruding from rear surface area 109, and contact conductive contact regions 301 and 302 of charging apparatus 300 when placed thereon.

FIG. 7A is an illustrated front-facing view of a charging apparatus 300 with a portable electronic device 100 placed thereon and in a charging position, in accordance with one embodiment of the present invention. Portable electronic device 100 is shown as having been placed "right side up" on charging apparatus 300. Conductive nodules 110a and 110b, as indicated by dotted lines, are shown to be in contact with conductive contact regions 302 and 301, respectively, thus enabling charging of portable electronic device 100.

FIG. 7B is an illustrated front-facing view of a charging apparatus 300 with a portable electronic device 100 placed thereon and in a charging position, in accordance with one embodiment of the present invention. Portable electronic device 100 is shown as having been placed "upside down" on charging apparatus 300. Conductive nodules 110a and 110b, as indicated by dotted lines, are shown to be in contact with conductive contact regions 301 and 302, respectively, thus enabling charging of portable electronic device 100.

Figure 12:
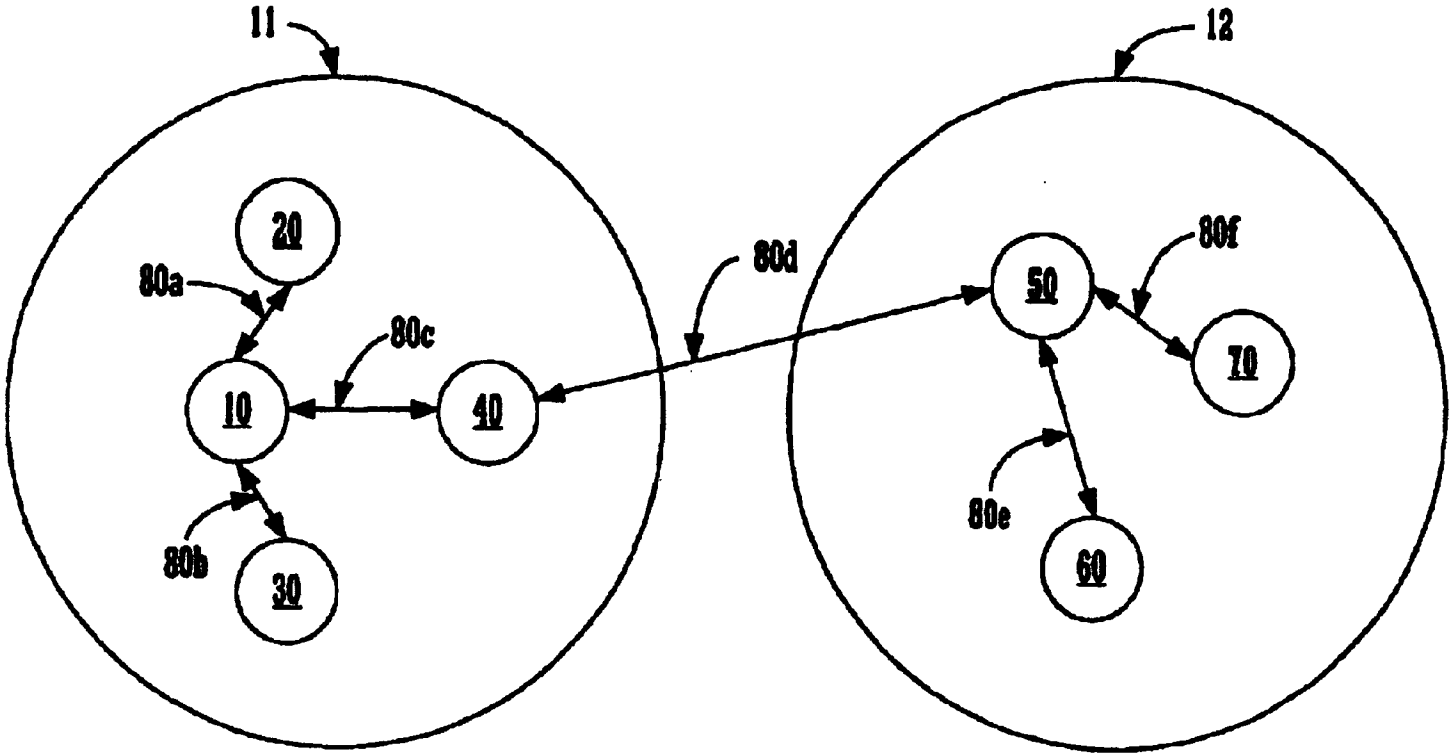
FIG. 12 illustrates one embodiment of a network of devices coupled using wireless connections, in accordance with one embodiment of the present invention.
Figure 13:
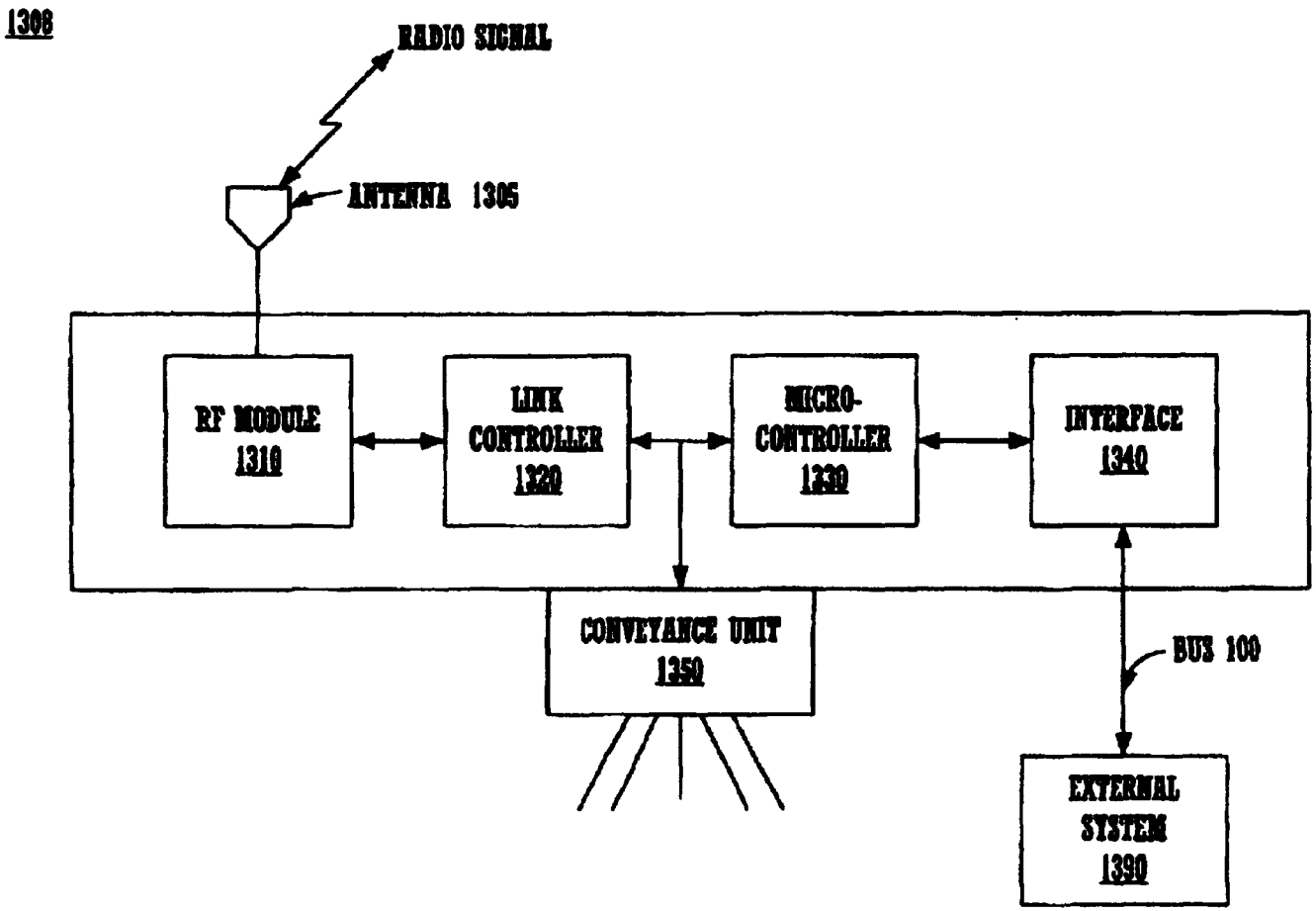
FIG. 13 is a block diagram showing one embodiment of a wireless transceiver in accordance with one embodiment the present invention.

It is noted that, in one embodiment, placing portable electronic device 100 upon charging apparatus 300 can initiate synchronization of data contained within portable electronic device 100, via the Bluetooth wireless interface of charging apparatus 300 of FIG. 3, also shown in FIG. 10, and as described in FIGS. 12 and 13.

Figure 11:
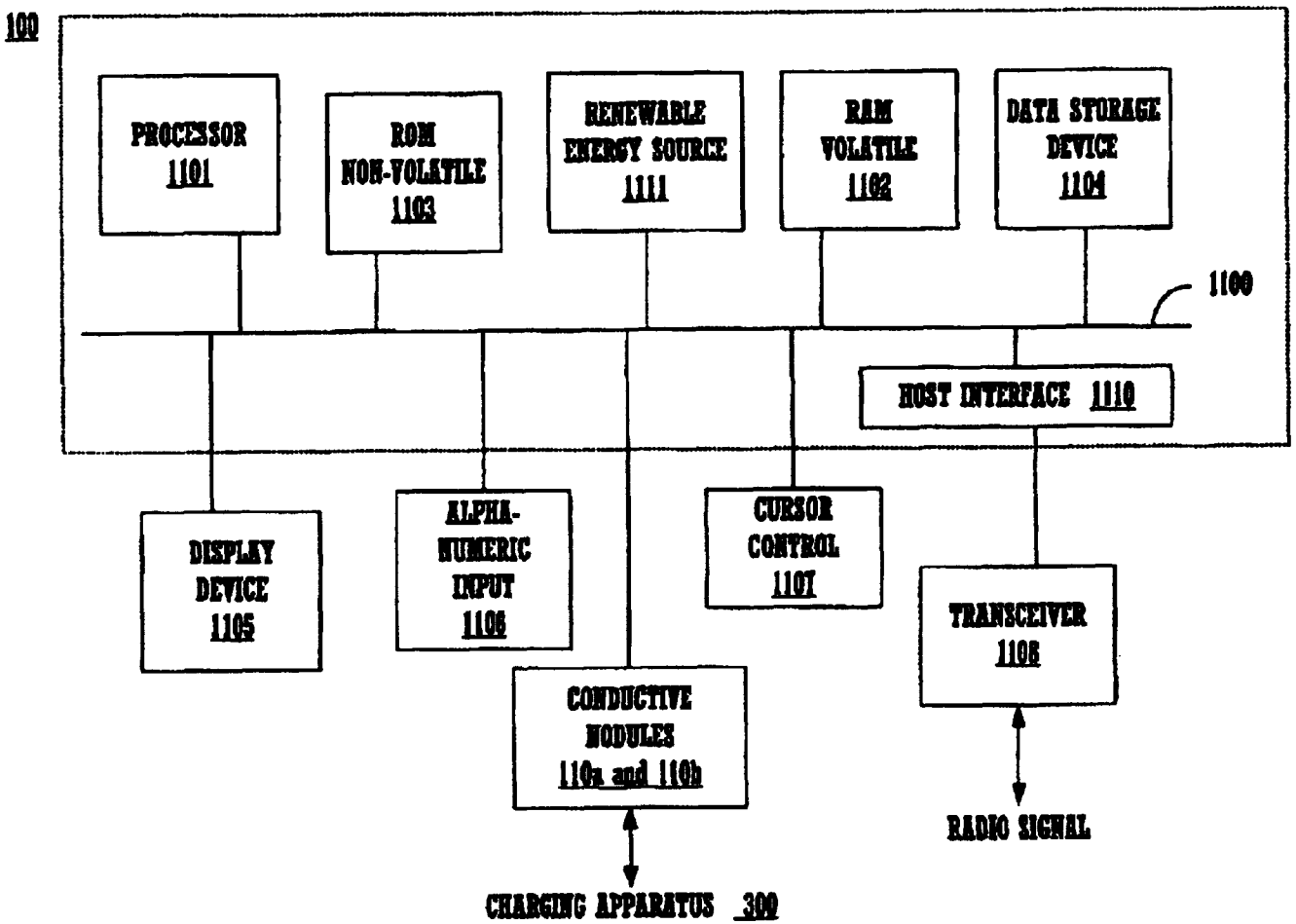
FIG. 11 is a block diagram of electronic circuitry and components integrated within a portable electronic device, in accordance with one embodiment of the present invention.

It is noted that, in one embodiment, placing portable electronic device 100 upon charging apparatus 300 can initiate synchronization of data contained within portable electronic device 100, via the Bluetooth wireless interface of portable electronic device 100 of FIGS. 6A and 6B, also shown in FIG. 11, and as described in FIGS. 12 and 13.

It is further noted that charge controller 325 of FIG. 10, enabled to sense the polarity of nodules 110a and 110b, controls the charging of portable electronic device 100 when placed on charging apparatus 300, regardless of whether portable electronic device 100 is placed right side up as shown in FIG. 7A, or placed upside down as shown in FIG. 7B.

Figure 8A:
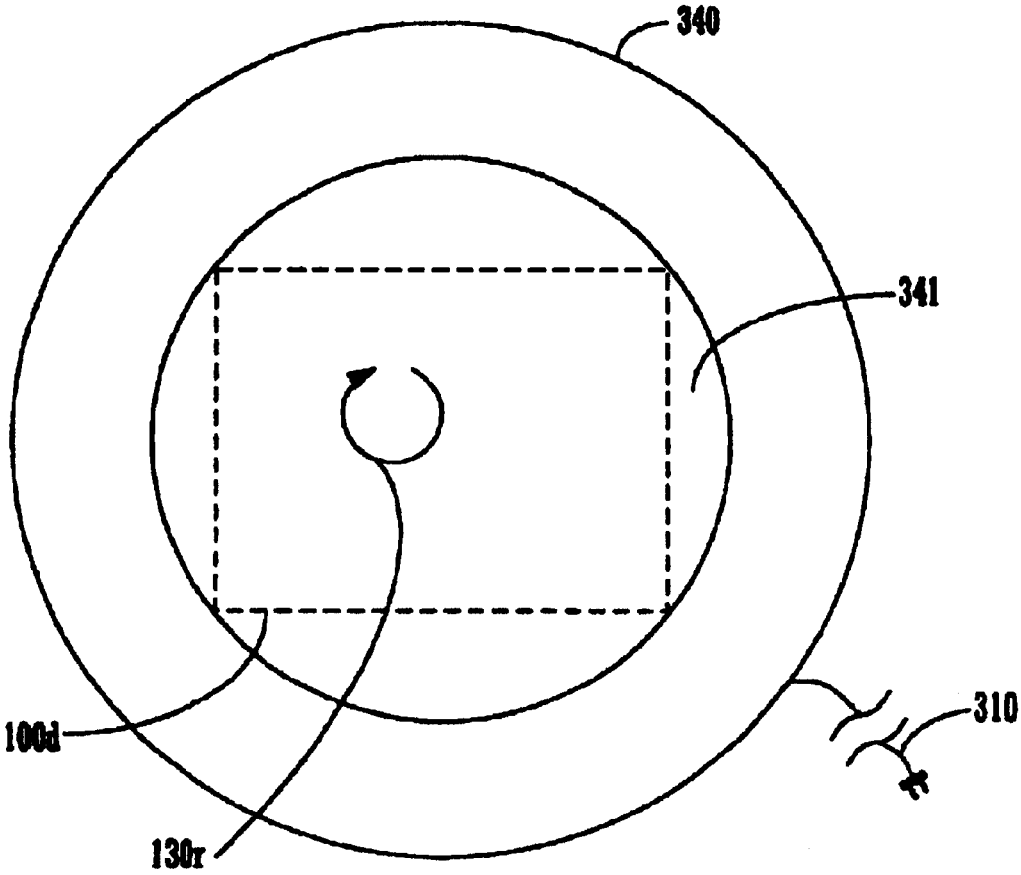
FIG. 8A is an illustrated front facing view of a charging apparatus, in accordance with one embodiment of the present invention.

FIG. 8A is an illustrated lop view of a charging apparatus 340, in accordance with one embodiment of the present invention. In the present embodiment, charging apparatus 340 is circular with a raised rim, similar in shape to a bowl. In another embodiment, charging apparatus 340 may be angular in appearance, e.g., having a triangular appearance, a rectangular appearance, a hexagonal appearance, and the like. Electrical outlet plug 310 is coupled to charging apparatus 340 and is analogous to electrical outlet plug 310 of FIGS. 3, 7A, and 7B. Contact region 341 is also shown and is functionally analogous to contact regions 301 and 302 of FIG. 3. However, in the present embodiment, contact region 341 is configured as a continuous conductive contact area. Thus, a portable electronic device, e.g., portable computer system 100 of FIG. 6A, as indicated by dotted line 100d, can be placed within charging apparatus 341 in any position, as indicated by rotational indicator 130r. A charge controller, e.g., charge controller 325 of FIG. 10, controls the charging of the portable electronic device and further guards against shorts.

Figure 8B:
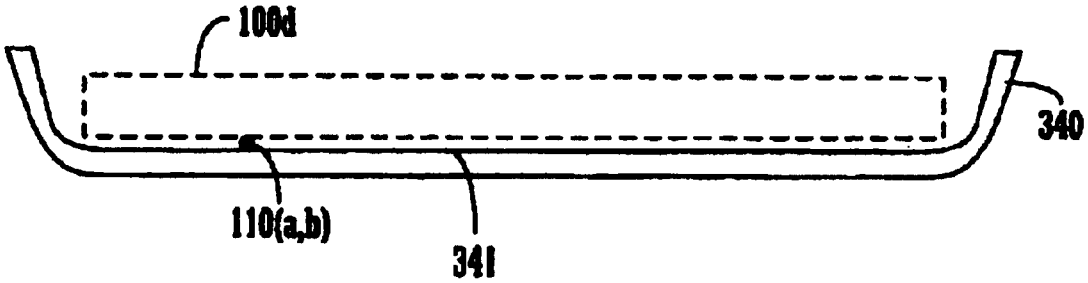
FIG. 8B is an illustrated profile view of charging apparatus of FIG. 8A, in accordance with one embodiment of the present invention.

FIG. 8B is an illustrated side view of a charging apparatus 340 shown with a portable electronic device, e.g., portable computer system 100 of FIG. 6A disposed therein, as indicated by dotted line 100d. Further, by virtue of conductive nodules 110 (a and b, as described in FIG. 6B) in contact with contact region 341, charging of a placed portable electronic device is enabled.

Figure 9:
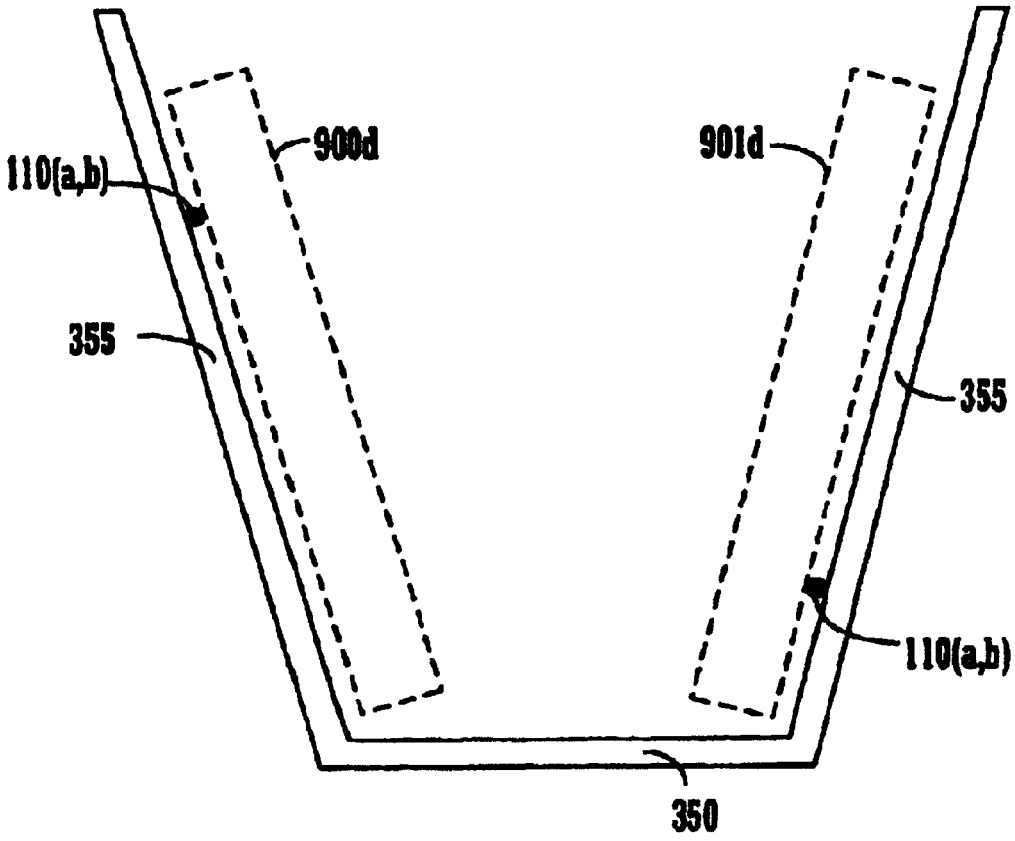
FIG. 9 is an illustrated view of a portable electronic device placed upon a charging apparatus, in accordance with one embodiment of the present invention.

FIG. 9 is an illustrated cut-away side view of charging apparatus 350, in another embodiment of the present invention. Charging apparatus 350 is functionally analogous to charging apparatus's 300 and 340 and analogous in shape to charging apparatus 340. In the present embodiment, charging apparatus 350 is shown to include side portions 355. Side portions 355 extend upward to enable vertical placement of a portable electronic device therein, e.g., portable computer system 100 of FIG. 7A, as indicated by dotted line 900d, and as depicted by an additional portable electronic device, e.g., portable computer system 100 of FIG. 7B, as indicated by dotted line 901d. The polarity sensing functionality and charge controlling capabilities of charge controller 325 (FIG. 10) further enable charging of multiple portable electronic devices.

FIG. 10 is a block diagram of components and circuitry integrated with a charging apparatus, e.g., charging apparatus 300, charging apparatus 340, or charging apparatus 350, of FIGS. 3, 5A, 5B, 8A, and 9. Shown is charge controller 325 coupled to bus 380. Charge controller 325 senses polarity of conductive nodules, e.g., conductive nodules 110 (a, b) of FIG. 6B, and controls the charging of a portable electronic device 100 when placed upon charging apparatus 300. Placement of a portable electronic device 100 upon charging apparatus 300 initiates the charging thereof. Bus 380 is an address/data/electrical bus for communicating information and energy transference to a placed portable electronic device 100.

With reference still to FIG. 10, charging apparatus 300 also includes a wireless signal transmitter/receiver device 308, which is coupled to bus 380 for providing a wireless communication link between charging apparatus 300 and a network environment (e.g., Bluetooth piconets 11 and 12 of FIG. 12). As such, wireless signal transmitter/receiver device 308 enables charging apparatus 300 to communicate wirelessly with other electronic systems coupled to the network. It should be appreciated that within the present embodiment, signal transmitter/receiver device 308 is coupled to antenna 1305 (FIG. 13) and provides the functionality to transmit and receive information over a wireless communication interface. It should be further appreciated that the present embodiment of signal transmitter/receiver device 308 is well suited to be implemented in a wide variety of ways. For example, signal transmitter/receiver device 308 could be implemented as a modem.

Still referring to FIG. 10, transceiver 308 can be coupled to charging apparatus 300 using any of a variety of physical bus interfaces (e.g., host interface 391), including but not limited to a Universal Serial Bus (USB) interface, Personal Computer (PC) Card interface, CardBus or Peripheral Component Interconnect (PCI) interface, Personal Computer Memory Card International Association (PCMCIA) interface, or RS-232 interface.

FIG. 11 illustrates, in one embodiment, circuitry integrated in a portable computer system 100, e.g., portable electronic device 100 of FIGS. 6A and 6B. Portable electronic device 100 includes an address/data bus 1100 for communicating information, a central processor 1101 coupled with the bus for processing information and instructions, a volatile memory 1102 (e.g., random access memory, RAM) coupled with the bus 1100 for storing information and instructions for the central processor 1101 and a non-volatile memory 1103 (e.g., read only memory, ROM) coupled with the bus 1100 for storing static information and instructions for the processor 1101. Electronic device 100 also includes an optional data storage device 1104 (e.g., compact flash, MMC, or memory stick) coupled with the bus 1100 for storing information and instructions. Device 1104 can be removable. As described above, portable electronic device 100 also contains a display device 105 coupled to the bus 1100 for displaying information to the computer user.

With reference still to FIG. 11, computer system 100 also includes a wireless signal transmitter/receiver device 1108, which is coupled to bus 1100 for providing a wireless communication link between computer system 100, and a network environment (e.g., Bluetooth piconets 11 and 12 of FIGS. 12). As such, wireless signal transmitter/receiver device 1108 enables central processor unit 1101 to communicate wirelessly with other electronic systems coupled to the network. It should be appreciated that within the present embodiment, signal transmitter/receiver device 1108 is coupled to antenna 1305 (FIG. 13) and provides the functionality to transmit and receive information over a wireless communication interface. It should be further appreciated that the present embodiment of signal transmitter/receiver device 1108 is well suited to be implemented in a wide variety of ways. For example, signal transmitter/receiver device 1108 could be implemented as a modem. Transceiver 1108 can be coupled to electronic device 100 using any of a variety of physical bus interfaces (e.g., host interface 1110), including but not limited to a Universal Serial Bus (USB) interface, Personal Computer (PC) Card interface, CardBus or Peripheral Component Interconnect (PCI) interface, Personal Computer Memory Card International Association (PCMCIA) interface, or RS-232 interface.

In one embodiment, the present invention, a charging apparatus 300 is communicatively and electronically coupleable with a portable electronic device, e.g., portable computer 100 via conductive nodules 110a and 110b (FIG. 6B).

Also included in computer system 100 of FIG. 11 is an optional alphanumeric input device 1106 that in one implementation is a handwriting recognition pad. Alphanumeric input device 1106 can communicate information and command selections to processor 1101. Electronic device 100 also includes an optional cursor control or directing device (on-screen cursor control 1107) coupled to bus 1100 for communicating user input information and command selections to processor 1101. In one implementation, on-screen cursor control device 1107 is a touch screen device incorporated with display device 1105. On-screen cursor control device 1107 is capable of registering a position on display device 1105 where the stylus makes contact. The display device 1105 utilized with electronic device 100 may be a liquid crystal display device, a field emission display device (also called a flat panel CRT) or other display device suitable for generating graphic images and alphanumeric characters recognizable to the user. In the preferred embodiment, display device 1105 is a flat panel display.

FIG. 12 illustrates the topology of a network of devices coupled using wireless connections in accordance with one embodiment of the present invention. In the parlance of Bluetooth, a collection of devices connected in a Bluetooth system are referred to as a "piconet" or a "subnet." A piconet starts with two connected devices, such as a computer system and a portable electronic device, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 11 using wireless 12 using wireless connections 80a–f. Piconet 11 and piconet 12 are coupled using wireless connection 80d. Devices 10–70 can be printers, personal digital assistants (PDAs), e.g., portable electronic device 100 of FIGS. 6A and 6B, desktop computer systems, laptop computer systems, cell phones, charging devices, e.g., charging apparatus 300 of FIGS. 3, 5A, 5B, 8A, 8B and 9, fax machines, keyboards, joysticks and virtually any other digital device. In the present embodiment, devices 10–70 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

FIG. 13 is a block diagram of one embodiment of a transceiver 1308 in accordance with the present invention. In a preferred embodiment (the "Bluetooth embodiment"), transceiver 1308 is a Bluetooth device comprising a digital component (e.g., a Bluetooth controller) and an analog component (e.g., a Bluetooth radio).

In the present embodiment, transceiver 1308 comprises an antenna 1305 for receiving or transmitting radio signals, a radio frequency (RF) module 1310, a link controller 13213, a microcontroller (or central processing unit) 1330, and an external interface 240. In the present embodiment, transceiver 1308 is coupled by a system bus 100 to an external device 1390 (e.g., a host device such as a computer system or similar intelligent electronic device, a PDA, a printer, a fax machine, etc.). However, it is appreciated that in another embodiment, transceiver 1308 may be integrated into external device 1390.

In the Bluetooth embodiment, RF module 1310 is a Bluetooth radio. The Bluetooth radio can provide: a bridge to existing data networks, a peripheral interface, and a mechanism to form piconets of connected devices away from fixed network infrastructures (see FIG. 12).

In the present embodiment, link controller 1320 is a hardware digital signal processor for performing baseband processing as well as other functions such as Quality-of-Service, asynchronous transfers, synchronous transfers, audio coding, and encryption.

In one embodiment, microcontroller 1330 is an application specific integrated circuit (ASIC). In the Bluetooth embodiment, microcontroller 1330 is a separate central processing unit (CPU) core for managing transceiver 1308 and for handling some inquiries and requests without having to involve the host device. In the Bluetooth embodiment, microcontroller 1330 runs software that discovers and communicates with other Bluetooth devices via the Link Manager Protocol (LMP).

With reference still to FIG. 13, in the present embodiment, interface 1340 is for coupling transceiver 1308 to external device 1390 in a suitable format (e.g., USB, PCMCIA, PCI, CardBus, PC Card, etc.). In the present embodiment, interface 1340 runs software that allows transceiver 1308 to interface with the operating system of external device 1390.

In conclusion, embodiments of the present invention provide an apparatus and system that allows charging of a portable electronic device, such as a handheld computer system. Further provided is a convenient and simple mating mechanism between the handheld computer and the charging apparatus. Advantageously, a portable electronic device may be leisurely placed into the charging apparatus at a number of various alignments while still being properly aligned for adequate recharging. Other advantages of embodiments of the present invention include complying with the many form factors of the various types and models of handheld computers. Additionally, embodiments of the present invention provide for synchronization of data and programs without requiring hard wiring of the cradle to the host computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A charging apparatus comprising:

a conductive region comprising a flat and substantially planar contactable exposed surface; [and]

a charge controller electronically coupled to said conductive region for polarity sensing and controlling the charging of a portable electronic device*; and*

*wireless communication circuitry for allowing wireless synchronization between said portable electronic device and a host device*, wherein said conductive region is adapted to have exposed nodules of said portable electronic device placed thereon to enable said charging of said portable electronic device.

2. The charging apparatus of claim 1 wherein said charging is initiated in response to said portable electronic device being placed on said conductive region and wherein said charge controller is for initiating said charging.

3. The charging apparatus of claim 1 wherein said contactable exposed surface comprises a first contactable conductive surface and a second contactable conductive surface.

4. The charging apparatus of claim 3 wherein said first contactable conductive surface and said second contactable conductive surface are each electrodes.

5. The charging apparatus of claim 1 further comprising disposition assistors for providing gross alignment of said portable electronic device with respect to said conductive region.

6. The charging apparatus of claim 4 wherein said first contactable conductive surface is positive and wherein said second contactable conductive surface is negative.

[7. The charging apparatus of claim 1 further comprising a wireless communication device for wireless synchronization between said portable electronic device and a host device.]

8. The charging apparatus of claim [7] *1* wherein said wireless synchronization is initiated in response to said portable electronic device being placed upon said conductive region.

9. A charging apparatus comprising:

a first flat conductive surface;

a second flat conductive surface; [and]

a charge controller electronically coupled to said first flat conductive surface and said second flat conductive surface, said charge controller for polarity sensing and for controlling charging of a portable electronic device*; and*

*wireless communication circuitry for allowing wireless synchronization of data between said portable electronic device and a host device*, wherein said portable electronic device is adapted to be placed on said first flat conductive surface and said second flat conductive surface, and wherein said charging controller is adapted to initiate charging of said portable electronic device in response to placement of said portable electronic device upon said surfaces.

[10. The charging apparatus of claim 9 further comprising a wireless communication device for wireless synchronization of data between said portable electronic device and a host device.]

11. The charging apparatus of claim [10] *9* wherein said wireless communication device is activated and said wireless synchronization is initiated after said portable electronic device is placed upon said surfaces.

12. The charging apparatus of claim 9 wherein said first flat conductive surface is a positive electrode and said second flat conductive surface is a negative electrode.

13. The charging apparatus of claim [10] *9* further comprising alignment lips for gross alignment of said portable electronic device with respect to said surfaces.

14. A charger comprising:

a first substantially planar electrode surface;

a second substantially planar electrode surface electrically isolated from said first substantially planar electrode surface, said electrode surfaces for electrically contacting nodules of a portable electronic device for charging a rechargeable energy source therein;

a charge controller coupled to said electrode surfaces and for determining a polarity thereof based on a determined polarity of said nodules, said charge controller for establishing said charging upon placement of said portable electronic device on said electrode surfaces*; and*

*wireless communication circuitry for allowing wireless synchronization between said portable electronic device and a host computer system*.

15. A charger as described in claim 14 further comprising mechanical lips disposed around said electrode surfaces forming a tray therewith for receiving said portable electronic device therein.

[16. A charger as described in claim 14 further comprising a wireless device for allowing wireless synchronization between said portable electronic device and a host computer system.]

17. A charger as described in claim [16] *14* wherein said synchronization is initiated upon said placement.

18. A charger as described in claim 14 wherein said nodules are conducting tips disposed along one side of said portable electronic device.

19. A portable electronic device comprising:

a processor coupled to a bus;

a memory coupled to said bus;

a rechargeable energy source; [and]

a contactable conductive element to said bus and said [renewable] *rechargeable* energy source and externally disposed on said portable electronic device, said conductive element configured to contact a flat planar charging electrode for charging said [renewable] *rechargeable* energy source*; and*

*wireless communication circuitry for allowing wireless synchronization between said portable electronic device and a host device*.

20. The portable electronic device of claim 19 wherein said contactable conductive element comprises a first nodule and a second nodule.

21. The portable electronic device of claim 19 wherein said first nodule is adapted to contact a positive flat electrode and wherein said second nodule is adapted to contact a flat negative electrode.

[22. The portable electronic device of claim 16 further comprising a wireless communication device for wireless synchronization between said portable electronic device and a host device.]

23. The portable electronic device of claim [22] *19* wherein said wireless communication [device] *circuitry* is [a] Bluetooth wireless [device] *communication circuitry*.

24. The portable electronic device of claim [22] *19* wherein placement of said portable electronic device on said electrode initiates said wireless synchronization.

25. A charging system comprising:

a charging apparatus comprising:

a conductive flat surface; and a charge controller electronically coupled to said conductive flat surface for polarity sensing and for controlling the charging of a portable electronic device;

*wireless communication circuitry for allowing wirelessly synchronizing said portable electronic device and a host device*; and wherein said portable electronic device comprises:

a rechargeable energy source; and a contactable conductive element coupled to said rechargeable energy source, said contactable conductive element externally disposed on said portable electronic device, said conductive element configured to contact said conductive flat surface;

wherein said charging apparatus is adapted to have said portable electronic device placed thereon to initiate said charging of said portable electronic device.

26. The charging system of claim 25 wherein said conductive flat surface comprises a first contactable flat surface and a second contactable flat surface.

27. The charging system of claim 26 wherein said first contactable flat surface and said second contactable flat surface each comprise a respective electrode.

28. The charging system of claim 27 wherein said first contactable flat surface is a positive electrode and wherein said second contactable flat surface is a negative electrode.

[29. The charging system of claim 25 wherein said charging apparatus further comprising a wireless communication device for wirelessly synchronizing said portable electronic device and a host device.]

30. The charging system of claim [29] *25* wherein said wireless synchronization is initiated in response to said portable electronic device being placed upon said charging apparatus.

31. The charging system of claim [23] *30* wherein said contactable conductive element of said portable electronic device comprises a first nodule and a second nodule.

32. The charging system of claim [30] *31* wherein said first nodule is a positive electrode and said second nodule is a negative electrode.

33. The charging system of claim 25 wherein said portable electronic device further comprises [a] wireless communication [device] *circuitry* for *allowing* wireless synchronization of said portable electronic device with a host device.

34. The charging system of claim 33 wherein said wireless communication [device] *circuitry of said portable electronic device* is [a] Bluetooth wireless [device] *communication circuitry*.

35. The charging system of claim 34 wherein placement of said portable electronic device on said charging apparatus initiates said wireless communication [device] *circuitry of said portable electronic device.*

*36. A charging apparatus comprising:*

*a charging surface for receiving a chargeable device;*

*a charge controller for coupling charge to said chargeable device received by said charging surface; and*

*wireless communication circuitry for allowing wirelessly synchronizing said chargeable device and a host device.*

*37. The charging apparatus as recited in claim 36 wherein said charge is electrically coupled to said chargeable device.*

*38. A chargeable device comprising:*

*chargeable unit for storing charge;*

*logic for enabling said chargeable unit to couple to an external charging source to receive charge; and*

*wireless communication circuitry for allowing wirelessly synchronizing said chargeable device and a host device.*

*39. The chargeable device as recited in claim 38 wherein said external charging source is an electrical charging source.*

* * * * *